(12) United States Patent
Briggs et al.

(10) Patent No.: US 8,573,854 B2
(45) Date of Patent: Nov. 5, 2013

(54) FIBER OPTIC CONNECTOR ASSEMBLY

(75) Inventors: Robert C. Briggs, Palmyra, PA (US); David R. Baechtle, Dillsburg, PA (US); Edmunc J. Haley, Dillsburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 253 days.

(21) Appl. No.: 13/089,078

(22) Filed: Apr. 18, 2011

(65) Prior Publication Data

US 2012/0263419 A1 Oct. 18, 2012

(51) Int. Cl.
*G02B 6/38* (2006.01)
*G02B 6/36* (2006.01)

(52) U.S. Cl.
USPC .................. 385/75; 385/55; 385/56; 385/58; 385/59; 385/60; 385/66; 385/76; 385/77; 385/78; 385/82; 385/84

(58) Field of Classification Search
USPC ....................................... 385/75, 82
See application file for complete search history.

(56) References Cited

U.S. PATENT DOCUMENTS 5,259,052 A * 11/1993 Briggs et al. ............... 385/78
6,832,858 B2 * 12/2004 Roth et al. ................. 385/71

* cited by examiner

*Primary Examiner* — Ryan Lepisto

(57) ABSTRACT

A fiber optic connector assembly includes a front housing and a rear housing movably coupled to the front housing between retracted and advanced positions. A drive mechanism is coupled to the rear housing that moves the rear housing from the retracted position to the advanced position. Fiber optic connectors are fixedly coupled to the rear housing with a mating end driven with respect to the front housing in a mating direction when the rear housing is moved from the retracted position to the advanced position. Optionally, the fiber optic connector assembly may be side-loaded into position with respect to a fixed connector assembly, and then the fiber optic connector is driven to the advanced position in a direction generally perpendicular to the direction of loading.

19 Claims, 3 Drawing Sheets

FIBER OPTIC CONNECTOR ASSEMBLY

BACKGROUND OF THE INVENTION

The subject matter herein relates generally to fiber optic connector assemblies.

Fiber optic connector systems include fiber optic connectors that are mated together to transmit signals therethrough. Some systems use assemblies that have housings that hold multiple fiber optic connectors and simultaneously mate multiple fiber optic connectors. In known systems, the housings are mated together in a direction that is generally parallel to the connector axes. However, a large area or space is needed in front of one of the assemblies to position the other assembly for mating. In some applications, space may be limited in front of the assembly, making mating of the assemblies difficult.

A need remains for a fiber optic connector system that allows fiber optic connector assemblies to be mated in tight spaces or in directions that are different than known systems.

BRIEF DESCRIPTION OF THE INVENTION

In one embodiment, a fiber optic connector assembly is provided having a front housing and a rear housing that is movably coupled to the front housing. The rear housing is movable between a retracted position and an advanced position. In the retracted position, the rear housing is spaced apart from the front housing. A drive mechanism is coupled to the rear housing. The drive mechanism moves the rear housing from the retracted position to the advanced position. At least one fiber optic connector fixedly coupled to the rear housing. The fiber optic connector has a mating end received by the front housing. The mating end driven with respect to the front housing in a mating direction for mating with a corresponding connector when the rear housing is moved from the retracted position to the advanced position. Optionally, the fiber optic connector assembly may be side-loaded into position with respect to a fixed connector assembly, and then the fiber optic connector is driven to the advanced position in a direction generally perpendicular to the direction of loading.

In another embodiment, a fiber optic connector system is provided having a fixed connector assembly that has at least one fixed fiber optic connector extending along a connector axis. The fixed connector assembly has a fixed housing having a front end and sides that extends from the front end generally parallel to the connector axis. A fiber optic connector assembly is removably coupled to the fixed connector assembly. The fiber optic connector assembly is side-loaded to an initial coupled position in a direction generally perpendicular to the connector axis. The fiber optic connector assembly is mated to the fixed connector assembly to a final coupled position in a direction generally parallel to the connector axis. The fiber optic connector assembly has at least one fiber optic connector that has a mating end that is mated with the corresponding fixed fiber optic connector when the fiber optic connector assembly is in the final coupled position.

In a further embodiment, a fiber optic connector system is provided having a fixed connector assembly that has at least one fixed fiber optic connector that extends along a connector axis. The fixed connector assembly has a fixed housing that has a front end and sides that extend from the front end generally parallel to the connector axis. A fiber optic connector assembly is removably coupled to the fixed connector assembly. The fiber optic connector assembly has a front housing and a rear housing that is movably coupled to the front housing. The front housing is latched to the front end of the fixed housing of the fixed connector assembly to secure the fiber optic connector assembly with respect to the fixed connector assembly. The fiber optic connector assembly has a drive mechanism that is coupled between the front housing and the rear housing. The drive mechanism moves the rear housing from a retracted position to an advanced position. The fiber optic connector assembly has at least one fiber optic connector that has a mating end that is driven with respect to the front housing in a mating direction generally parallel to the connector axis for mating with a corresponding fixed fiber optic connector when the rear housing is moved from the retracted position to the advanced position.

DETAILED DESCRIPTION OF THE INVENTION

Figure 1:
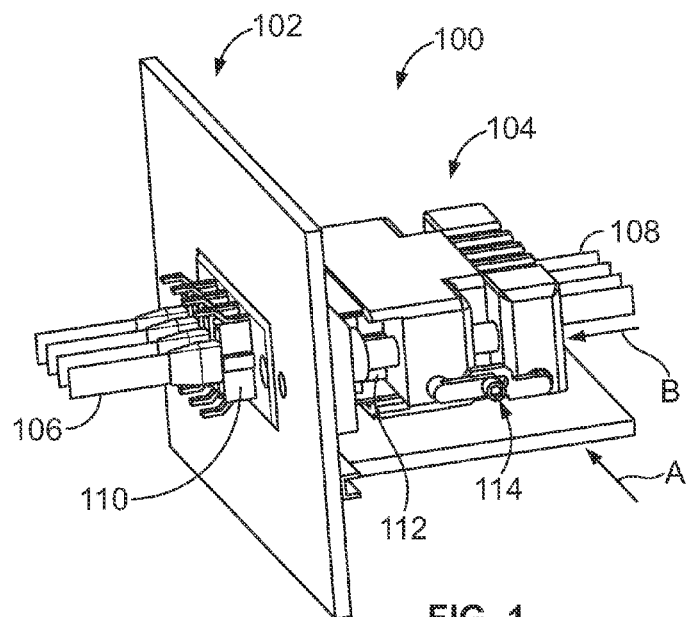
FIG. 1 is a perspective view of a fiber optic connector system formed in accordance with an exemplary embodiment.

FIG. 1 is a perspective view of a fiber optic connector system 100 formed in accordance with an exemplary embodiment. The fiber optic connector system 100 includes a fixed connector assembly 102 and a fiber optic connector assembly 104 that is removably coupled to the fixed connector assembly 102. The fixed connector assembly 102 may be fixed within a computer, a network device, or another electronic device and positioned for mating with the fiber optic connector assembly 104. For example, the fixed connector assembly 102 may define, or form part of, a fixed card within an electronic device. The fixed connector assembly 102 is held in place while the fiber optic connector assembly 104 is mated to, or unmated from, the fixed connector assembly 102. For example, the fiber optic connector assembly 104 may define, or form part of, a secondary card or network card that is moved into position and then mated with the fixed connector assembly 102. The secondary card may be loaded through a card slot into position with respect to the fixed connector assembly 102 and then mated to the fixed connector assembly 102 to connect fiber optic cables 106, 108 held by the fixed connector assembly 102 and fiber optic connector assembly 104, respectively.

In an exemplary embodiment, the fiber optic connector assembly 104 is configured to be side-loaded into position with respect to the fixed connector assembly 102 and then mated with the fixed connector assembly 102 by a secondary operation. For example, the fiber optic connector assembly 104 is initially side-loaded in a loading direction, shown by the arrow A, to an initial coupled position. In the initial coupled position, the fiber optic connector assembly 104 is generally coupled to the fixed connector assembly 102 and held in place; however, fiber optic connectors 110, 112 of the fixed connector assembly 102 and the fiber optic connector assembly 104, respectively, are unmated. The fiber optic connector assembly 104 is then moved to a final coupled position, in which the fiber optic connectors 110, 112 of the fixed connector assembly 102 and fiber optic connector assembly 104 are mated. The mating direction is shown by arrow B and is oriented generally perpendicular to the loading direction. In an exemplary embodiment, a drive mechanism 114 of the fiber optic connector assembly 104 is used to move the fiber optic connector assembly 104 in the mating direction to the final coupled position. By side-loading the fiber optic connector assembly 104 in the loading direction, less space is needed in front of the fixed connector assembly 102 for mating the fiber optic connector assembly 104 to the fixed connector assembly 102. The fiber optic connector system 100 may be used in tight spaces or in certain applications that require side-loading of a secondary card to a fixed card.

Figure 2:
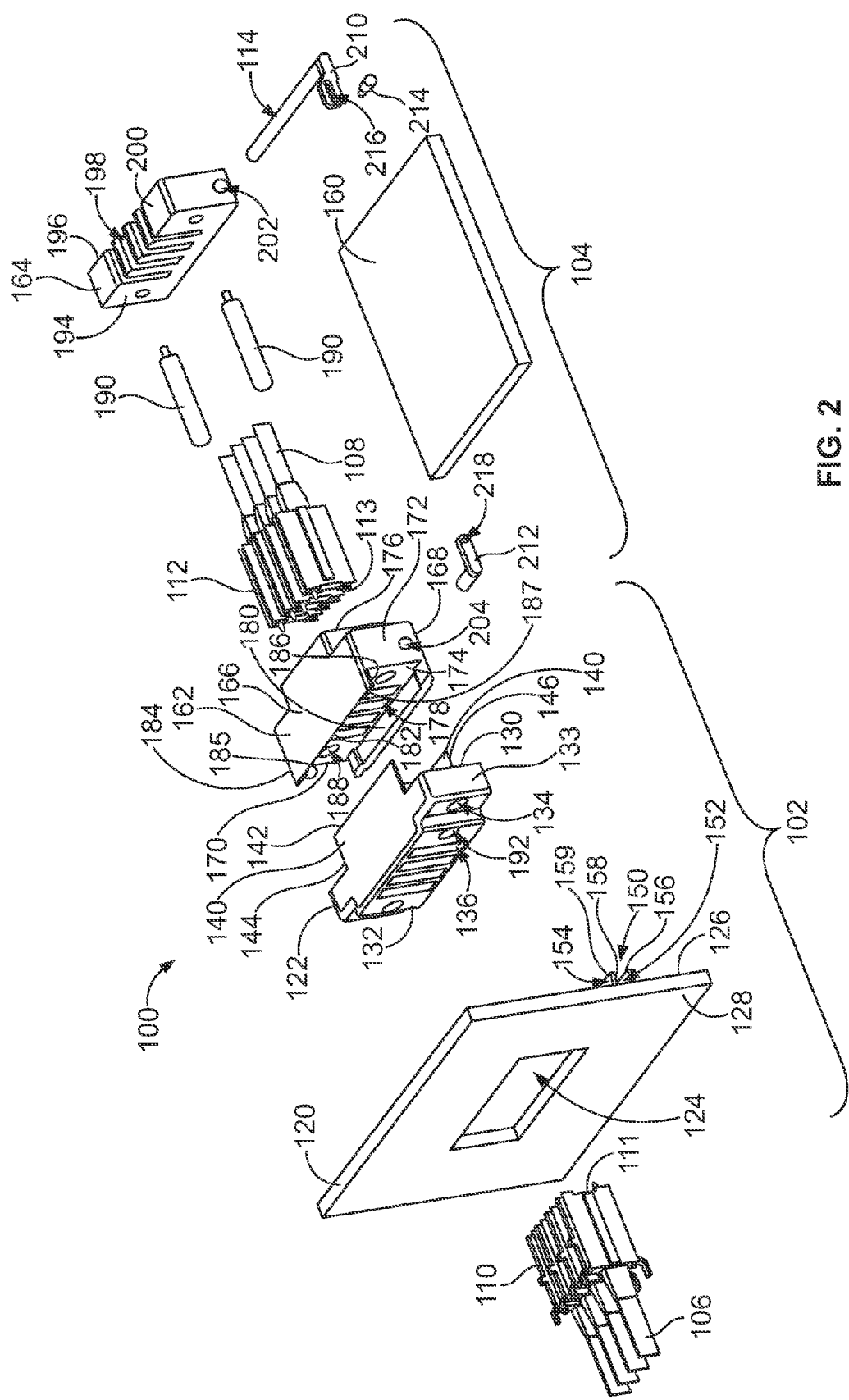
FIG. 2 is an exploded view of the fiber optic connector system.

FIG. 2 is an exploded perspective view of the fiber optic connector system 100. The fixed connector assembly 102 includes a panel 120, a fixed housing 122 that is configured to be coupled to the panel 120, and a plurality of the fiber optic connectors 110 terminated to ends of the fiber optic cables 106. The fiber optic connectors 110 have mating ends 111. The connectors 110 are configured to be loaded into the fixed housing 122 and held in position with respect to the panel 120 by the fixed housing 122.

The panel 120 includes a panel opening 124 that receives the fixed housing 122. The panel 120 has a front 126 and a back 128. The fixed housing 122 is generally held along the front 126, however a portion of the fixed housing 122 may extend through the panel opening 124 to the back 128. Optionally, the fixed housing 122 may be able to float within the panel opening 124. The fiber optic cable 106 extends rearward from the back 128.

The fixed housing 122 has a front end 130 and a back end 132 with sides 133 extending therebetween. The back end 132 is mounted to the front 126 of the panel 120. The fixed housing 122 includes mounting openings 134 extending therethrough that receive fasteners (not shown) for securing the fixed housing 122 to the panel 120.

The fixed housing 122 includes a plurality of connector channels 136 extending therethrough. The fiber optic connectors 110 are received within the connector channels 136. The fiber optic connectors 110 extend through the connector channels 136 to the front end 130 for mating with the fiber optic connectors 112 of the fiber optic connector assembly 104. The fiber optic connectors 112 have mating ends 113 that are mated with the mating ends 111 of the fiber optic connectors 110.

The fixed housing 122 includes projections 140 extending forward from a front end 130. The projections 140 have a front edge 142 and opposite sides 144, 146. The projections 140 are spaced apart from one another such that a gap exists between the projections 140. The fiber optic connectors 110 are at least partially positioned within the gap between the projections 140. The gap is open between the sides 144 of the upper and lower projections 140 and between the sides 146 of the upper and lower projections 140. Any number of projections 140 may be provided in alternative embodiments.

The fiber optic connector assembly 104 is configured to be coupled to the projections 140 to secure the fiber optic connector assembly 104 to the fixed connector assembly 102. The projections 140 define latching features to secure the fiber optic connector assembly 104 to the fixed connector assembly 102. The projections 140 may have different sizes and/or shapes in alternative embodiments to allow the fiber optic connector assembly 104 to be secured to the fixed connector assembly 102. Other types of securing features may be used to secure the fiber optic connector assembly 104 to the fixed housing 122. Alternatively, the fiber optic connector assembly 104 may be secured in position with respect to the fixed housing 122 by other means, such as by securing the fiber optic connector assembly 104 to the panel 120 or another component rather than directly to the fixed housing 122.

The panel 120 includes a rail 150 generally aligned with the panel opening 124 below the panel opening 124. The rail 150 includes a track 152 between an upper rail member 154 and a lower rail member 156. The track 152 is open at a front 159 of the rail 150 and at a side 158 of the rail 150. The track 152 is configured to receive a base 160 of the fiber optic connector assembly 104. The base 160 is configured to be slid into the track 152 from the side 158. The rail 150 guides side-loading of the fiber optic connector assembly 104 into position with respect to the fixed connector assembly 102. The rail 150 maintains a vertical position of the base 160 with respect to the fixed housing 122.

The fiber optic connector assembly 104 includes a front housing 162 that is configured to be mounted to the base 160 and a rear housing 164 that is movably coupled to the front housing 162. The front housing 162 includes a top 166, a bottom 168 and opposite sides 170, 172 that extend between the top and bottom 166, 168. The front housing 162 includes a front end 174 and a back end 176 opposite the front end 174. Connector channels 178 extend through the front housing 162 between the front end 174 and the back end 176. The connector channels 178 receive the fiber optic connectors 112.

The front housing 162 is configured to be coupled to the fixed housing 122 of the fixed connector assembly 102. Once the front housing 162 is coupled to the fixed housing 122, the fiber optic connectors 112 may be moved in a mating direction toward the fiber optic connectors 110 for mating the fiber optic connectors 112 to the fiber optic connectors 110. In an alternative embodiment, the connector assembly 102 may be movable as opposed to being fixed such that the housing 122 is movable in a mating direction after the fiber optic connector assembly 104 were side mounted to the connector assembly 102. In such embodiment, the fiber optic connector assembly 104 may only include a single, fixed housing, while the connector assembly 102 includes two housings, one being movable with respect to the other.

The front housing 162 includes latches 180 extending forward from the front end 174. The latches 180 are configured to be coupled to the projections 140 to secure the front housing 162 to the fixed housing 122. The latches 180 have a front edge 182 and extend between opposite sides 184, 186. Lips 185, 187 are provided at the sides 184, 186, respectively. The lips 185, 187 define bumps or protrusions that extend inward toward the center of the front housing 162. A gap is defined between the latches 180. The fiber optic connectors 112 may be at least partially received within the gap. In an exemplary embodiment, the gap is open between the sides 184 of the upper and lower latches 180 and is open between the sides 186 of the upper and lower latches 180. The lips 185, 187 extend at least partially into the gap to engage the projections 140.

The front housing 162 includes alignment openings 188 that extend between the front end 174 and the back end 176. The alignment openings 188 are configured to receive guide rods 190 therein. The guide rods 190 guide movement of the rear housing 164 with respect to the front housing 162. The guide rods 190 are also configured to be received within alignment features 192 of the fixed housing 122. In the illustrated embodiment, the alignment features 192 are openings extending through the fixed housing 122. The guide rods 190 may be received within the openings defining the alignment features 192 as the rear housing 164 is advanced by the drive mechanism 114, as described in further detail below.

The rear housing 164 includes a front end 194 and a back end 196. The rear housing 164 includes a plurality of slots 198 formed therein. Optionally, the slots 198 may be open at a top 200 of the rear housing 164. The slots 198 receive the fiber optic connectors 112 and/or the fiber optic cables 108. The fiber optic connectors 112 may be fixedly held by the rear housing 164 such that the fiber optic connectors 112 do not move with respect to the rear housing 164. The fiber optic connectors 112 may be advanced forward with the rear housing 164 during the mating operation.

In an exemplary embodiment, the rear housing 164 includes a bore 202 extending at least partially therethrough. A portion of the drive mechanism 114 may be received in the bore 202 to secure the drive mechanism 114 to the rear housing 164. In an exemplary embodiment, the front housing 162 includes a bore 204 in the side 172. A portion of the drive mechanism 114 is received in the bore 204 to secure the drive mechanism 114 to the front housing 162. In an alternative embodiment, the drive mechanism 114 may be attached to the base 160 as opposed to be supported by the front housing 162 or the rear housing 164. The drive mechanism 114 may then be coupled to one of the front or rear housings 162, 164 to move the corresponding housing 162, 164 with respect to the other housing 162, 164. In another alternative embodiment, the drive mechanism 114, or an additional drive mechanism, may be part of the connector assembly 102 associated with the panel 120 such that the connector assembly 102 were movable.

The drive mechanism 114 includes a cam 210 and a slide 212 configured to be coupled to the cam 210 using a pin 214. The cam 210 includes a slot 216 therein. The pin 214 is configured to be received in the slot 216. Rotation of the pin 214 may cause the pin 214 to move longitudinally within the slot 216. The pin 214 may also be received within an opening 218 in the slide 212. As the pin 214 moves along the cam 210, the cam 210 is moved by the pin 214 in a linear direction with respect to the slide 212. Such movement causes relative movement of the rear housing 164 with respect to the front housing 162, as will be described in further detail below.

Figure 3:
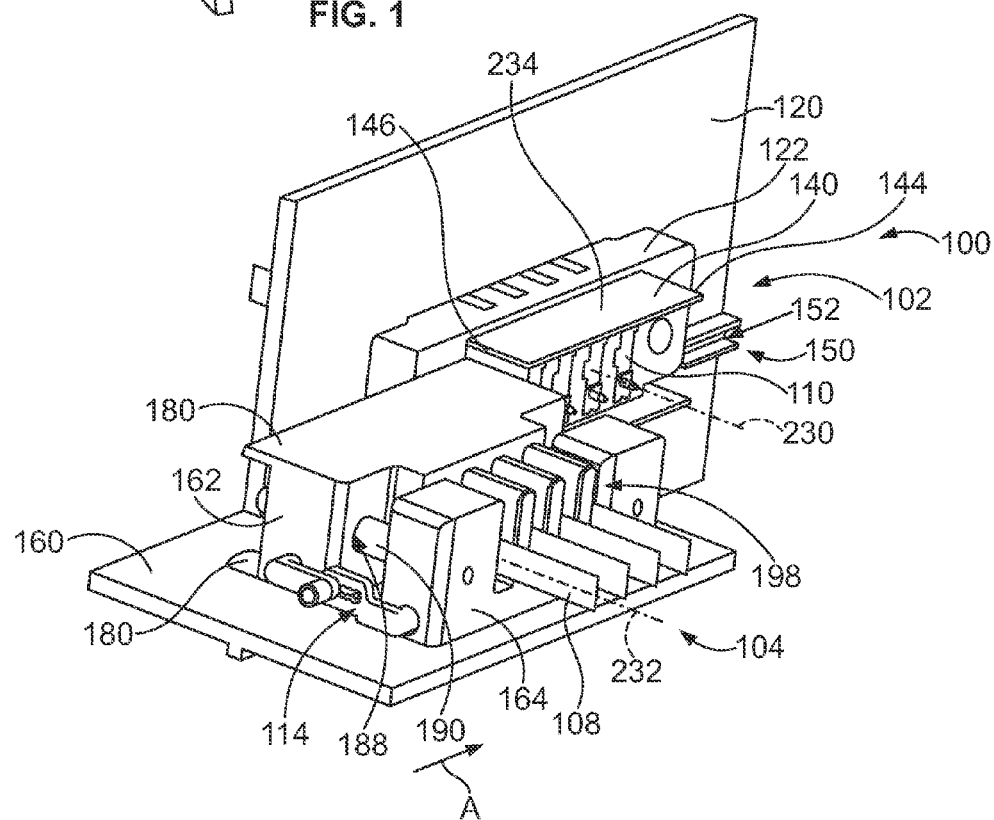
FIG. 3 is a perspective view of the fiber optic connector system showing a fiber connector assembly being coupled to a fixed connector assembly of the fiber optic connector system.

FIG. 3 is a rear perspective view of the fiber optic connector system 100 with the fiber optic connector assembly 104 poised for coupling to the fixed connector assembly 102. When assembled, the fixed housing 122 is mounted to the panel 120. Optionally, the fixed housing 122 may be able to float with respect to the panel 120. When assembled, the front housing 162 is mounted to the base 160. Optionally, the front housing 162 may be able to float with respect to the base 160, such as along the plane of the base 160 or perpendicular to the base 160. The rear housing 164 is moveably coupled to the front housing 162 using the drive mechanism 114.

The fiber optic connectors 112 (shown in FIG. 2) and the fiber optic cables 108 extend rearward from the rear housing 164. When the fiber optic connector assembly 104 is assembled, the fiber optic connectors 112 are loaded into the connector channels 178 (shown in FIG. 2) of the front housing 162. The fiber optic connectors 112 are also fixedly received in the slots 198, with the fiber optic cables 108 extending rearward from the corresponding slots 198.

The guide rods 190 are coupled to the rear housing 164 and extend into the alignment openings 188 of the front housing 162. The guide rods 190 guide relative movement between the rear housing 164 and the front housing 162. For example, as the rear housing 164 is advanced towards the front housing 162, the guide rods 190 slide forward within the alignment openings 188. When assembled, the guide rods 190 also extend into the fixed housing 122 to align the rear housing 164 and front housing 162 to the fixed housing 122.

During a loading operation, the fiber optic connector assembly 104 is side-loaded into position with respect to the fixed connector assembly 102 in a loading direction, shown by the arrow A. The base 160 is received in the track 152 of the rail 150. The track 152 guides movement of the fiber optic connector assembly 104 in the side-loading direction generally parallel to the panel 120. The side-loading direction is generally perpendicular to connector axes 230 of the fiber optic connectors 110 and connector axes 232 of the fiber optic connectors 112. During loading, the connector axes 230 are maintained generally parallel to the connector axes 232.

When the base 160 is received in the rail 150 the latches 180 are aligned with the projections 140 and positioned to the side of the projections 140. As the fiber optic connector assembly 104 is loaded in the loading direction, the latches 180 engage corresponding projections 140. As the fiber optic connector assembly 104 is loaded in the loading direction, the latches 180 slide along outer surfaces 234 of the projections 140. Once fully loaded, the lips 185, 187 (shown in FIG. 2) engage corresponding sides 144, 146 of the projections 140. The projections 140 are held between the lips 185, 187. Engagement of the lips 185, 187 with the sides 144, 146 resists side-to-side movement of the front housing 162 with respect to the fixed housing 122. The latches 180 align the front housing 162 with the fixed housing 122 such that the connector axes 232 of the fiber optic connectors 112 are aligned with corresponding connector axes 230 of the corresponding fiber optic connectors 110.

Figure 4:
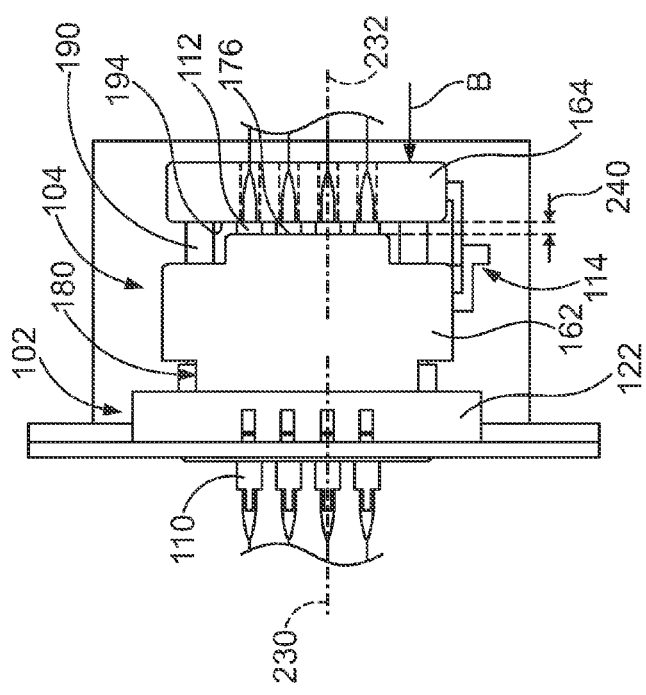
FIG. 4 is a top view the fiber optic connector assembly in an initial coupled position with the fixed connector assembly.

FIG. 4 illustrates the fiber optic connector assembly 104 in an initial coupled position with respect to the fixed connector assembly 102. In the initial coupled position, the front housing 162 is coupled to the fixed housing 122. The latches 180 engage the projections 140 (shown in FIG. 3), and the lips 185, 187 (shown in FIG. 2) engage the sides 144, 146 (shown in FIG. 2) of the projections 140 to hold the front housing 162 on the fixed housing 122. The connector axes 232 are aligned with corresponding connector axes 230 of the fiber optic connectors 110.

In the initial coupled position, the fiber optic connectors 110, 112 are unmated. The fiber optic connectors 110, 112 are spaced apart from one another to allow the fiber optic connector assembly 104 to be side-loaded into position with respect to the fixed connector assembly 102. Once the fiber optic connector assembly 104 is positioned in the initial coupled position, the rear housing 164 may be moved toward the front housing 162 to move the fiber optic connectors 112 toward the fiber optic connectors 110 and to mate the fiber optic connectors 112 with the fiber optic connectors 110. Actuation of the drive mechanism 114 moves the rear housing 164 from a retracted position to an advanced position in a direction generally toward the front housing 162.

In the initial coupled position, the front end 194 of the rear housing 164 is spaced apart from the back end 176 of the front housing 162 by a distance 240. The drive mechanism 114 is used to move the rear housing 164 from the retracted position in an advancing direction, shown by the arrow B, toward the front housing 162 to an advanced position (shown in FIG. 6). The guide rods 190 guide the movement of the rear housing 164 with respect to the front housing 162. The guide rods 190 also align the front and rear housings 162, 164 with the fixed housing 122.

The fiber optic connectors 112 are secured and fixed in position with respect to the rear housing 164. Optionally, the fiber optic connectors 112 may be spring loaded in the hear housing 164 to allow floating of the fiber optic connectors 112 in the direction of mating with the fiber optic connectors 110 and/or to maintain pressure toward the fiber optic connectors 110 when mated. The fiber optic connectors 112 are slideable or moveable within the connector channels 178 (shown in FIG. 2) of the front housing 162 such that the fiber optic connectors 112 may be advanced with respect to the front housing 162 for mating with the fiber optic connectors 110.

Figure 5:
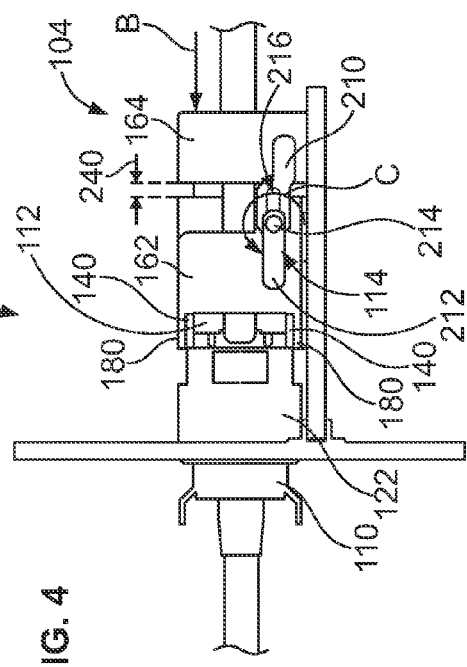
FIG. 5 is a side view of the fiber optic connector system in the initial coupled position.

FIG. 5 is a side view of the fiber optic connector system 100 showing the fiber optic connector assembly 104 in the initial coupled position. In the initial coupled position, the latches 180 of the front housing 162 are secured to the projections 140 of the fixed housing 122. The fiber optic connectors 112 are aligned with the fiber optic connectors 110. The rear housing 164 is spaced apart from the front housing 162 by the distance 240. Actuation of the drive mechanism 114 drives the rear housing 164 forward toward the front housing 162 to close the gap between the rear housing 164 and the front housing 162. Forward movement of the rear housing 164 in the mating direction, shown by the arrow B, drives the fiber optic connectors 112 into mating engagement with the fiber optic connectors 110.

In an exemplary embodiment, the drive mechanism 114 is operated by rotating the pin 214, such as in the direction of arrow C, which causes the cam 210 to move forwardly with respect to the slide 212. The slot 216 includes ribs or teeth that engage the pin 214 such that rotation of the pin 214 causes the cam 210 to move in a forward direction. As the cam 210 is moved forward, the cam 210 pulls the rear housing 164 in the mating direction toward the front housing 162. The rear housing 164 is moved from the retracted position, shown in FIG. 5, to the advanced position (shown in FIG. 6). Other types of drive mechanisms may be used in alternative embodiments to drive the rear housing 164 toward the front housing 162, and thus drive the fiber optic connectors 112 toward the fiber optic connectors 110.

Figure 6:
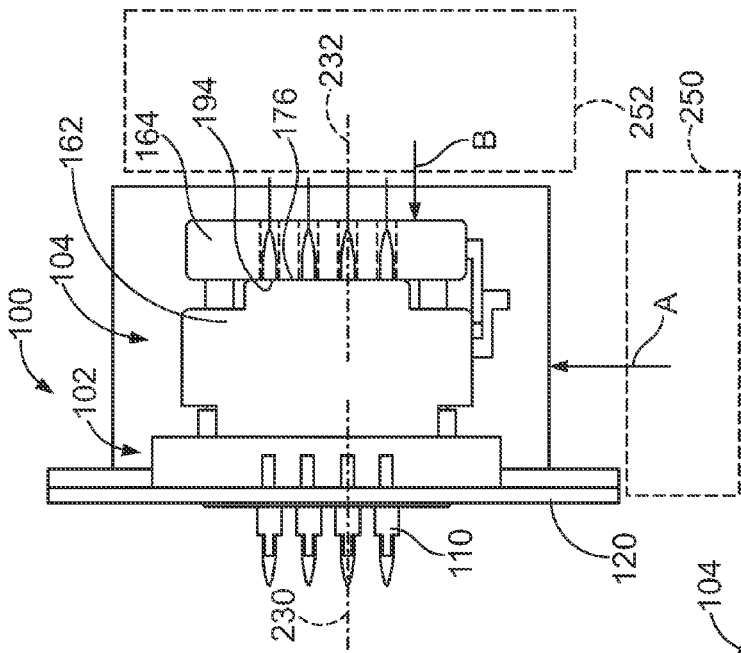
FIG. 6 is a top view of the fiber optic connector system showing the fiber optic connector assembly in a final coupled position.

FIG. 6 is a top view of the fiber optic connector system 100 showing the fiber optic connector assembly 104 in a final coupled position. In the final coupled position, the rear housing 164 is in the advanced position. Optionally, the front end 194 of the rear housing 164 engages the back end 176 of the front housing 162. In the final coupled position, the fiber optic connectors 112 are mated with the fiber optic connectors 110.

The fiber optic connector system 100 allows side-loading of the fiber optic connector assembly 104 into position with respect to the fixed connector assembly 102 in the loading direction, shown by arrow A, generally parallel to the panel 120 and perpendicular to the connector axes 230, 232. The fiber optic connectors 110, 112 are mated in a mating direction, shown by arrow B, which is generally perpendicular to the loading direction and parallel to the connector axes 230, 232. Side-loading of the fiber optic connector assembly 104 allows loading of the fiber optic connector assembly 104 from an area 250 that is positioned at a side of the fixed connector assembly 102. Side-loading of the fiber optic connector assembly 104 does not require the fiber optic connector assembly 104 to be loaded from an area 252 in front of the fixed connector assembly 102. As such, other components may be positioned in the area 252, while still allowing the fiber optic connector assembly 104 to be mated with the fixed connector assembly 102.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A fiber optic connector assembly comprising:
a front housing side loaded to an initial coupled position in which the front housing is configured to be coupled to a fixed connector housing;
a rear housing movably coupled to the front housing, the rear housing being movable in an advancing direction from a retracted position to an advanced position, in the retracted position the rear housing is spaced apart from the front housing;
wherein the front housing is side loaded in a direction generally perpendicular to the advancing direction;
a drive mechanism coupled to the rear housing, the drive mechanism moving the rear housing from the retracted position to the advanced position; and
a plurality of fiber optic connectors fixedly coupled to the rear housing, the fiber optic connectors having mating ends received by the front housing, the mating ends being driven with respect to the front housing in a mating direction for mating with corresponding connectors when the rear housing is moved from the retracted position to the advanced position.

2. The fiber optic connector assembly of claim 1, wherein the front housing and the rear housing are coupled to a base defining a card, the rear housing is movable relative to the base in the advancing direction, the base and front housing being side-loaded together relative to the fixed connector assembly during assembly in a direction generally perpendicular to the advancing direction.

3. The fiber optic connector assembly of claim 1, wherein the drive mechanism includes a cam coupled to one of the front housing or the rear housing and the drive mechanism includes a slide coupled to the other of the front housing or the rear housing, the cam moving linearly along the slide.

4. The fiber optic connector assembly of claim 1, further comprising guide rods extending from the rear housing through alignment openings in the front housing, the guide rods being configured to engage corresponding alignment features of a fixed connector assembly when the rear housing is moved to the advanced position.

5. The fiber optic connector assembly of claim 1, further comprising a base, the front housing being fixedly coupled to the base, the rear housing being moveable with respect to the base.

6. The fiber optic connector assembly of claim 1, wherein the front housing includes a latch configured to secure the front housing to a fixed connector assembly, the rear housing being moved to the advanced position after the front housing is secured to the fixed connector assembly to advance the fiber optic connectors into engagement with corresponding fixed fiber optic connectors of the fixed connector assembly.

7. The fiber optic connector assembly of claim 1, wherein the front housing includes a front end and upper and lower latches extending forward from the front end of the front housing, an opening being defined between the upper and lower latches forward of the front end, the front housing being side-loaded onto a fixed such that the fixed connector assembly is received in the opening through an open side of the opening.

8. The fiber optic connector assembly of claim 1, wherein the rear housing includes slots, the fiber optic connectors being loaded into, and held within, corresponding slots, the front housing includes connector channels that receive the mating ends of corresponding fiber optic connectors, the fiber optic connectors being slideable within the connector channels as the rear housing is moved between the retracted position and the advanced position.

9. A fiber optic connector system comprising:
a fixed connector assembly having a plurality of fixed fiber optic connectors extending along connector axes, the fixed connector assembly having a fixed housing having a front end and sides extending from the front end generally parallel to the connector axes; and
a fiber optic connector assembly removably coupled to the fixed connector assembly, the fiber optic connector assembly being side-loaded to an initial coupled position in a direction generally perpendicular to the connector axes, the fiber optic connector assembly being mated to the fixed connector assembly to a final coupled position in a direction generally parallel to the connector axes, the fiber optic connector assembly having a plurality of fiber optic connectors having mating ends being mated with corresponding fixed fiber optic connectors when the fiber optic connector assembly is in the final coupled position.

10. The fiber optic connector system of claim 9, wherein the fixed connector assembly includes a panel having a panel opening, the fixed housing extending through the panel opening in the panel, the panel having a rail extending therefrom proximate the panel opening, the fiber optic connector assembly having a base being side-loaded onto the rail to position the fiber optic connector assembly with respect to the fixed connector assembly.

11. The fiber optic connector system of claim 9, wherein the fixed connector assembly includes a panel having a front and a panel opening therethrough, the panel having a rail extending from the front proximate the opening, the rail having an open front and an open side, the fiber optic connector assembly having a base being loaded into the rail through the open side to position the fiber optic connector assembly with respect to the fixed connector assembly, the base extending forward from the front when the fiber optic connector assembly is coupled to the fixed connector assembly.

12. The fiber optic connector system of claim 9, wherein the fixed housing includes a projection extending forward therefrom, the projection extending between opposite sides and a front edge, the fiber optic connector assembly having a front housing and a rear housing moveably coupled to the front housing, the front housing having a latch extending therefrom, the fiber optic connector assembly being side-loaded such that the latch is loaded over, and slides along, one of the sides of the projection, the latch engaging both sides of the projection when the fiber optic connector assembly is coupled to the fixed connector assembly, the fiber optic connector assembly extending forward of the front edge of the projection when the fiber optic connector assembly is coupled to the fixed connector assembly.

13. The fiber optic connector system of claim 9, wherein the fiber optic connector assembly includes a drive mechanism coupled between a front housing and a rear housing, the front housing being coupled to the fixed housing, the fiber optic connectors being held by the rear housing, the drive mechanism being operated to move the rear housing toward the front housing to mate the fiber optic connectors to the fixed fiber optic connectors.

14. The fiber optic connector system of claim 9, wherein the fiber optic connector assembly includes a front housing and a rear housing, the front housing being coupled to the fixed housing, the fiber optic connectors being held by the rear housing, the fiber optic connector assembly having guide rods extending from the rear housing through alignment openings in the front housing, the guide rods being configured to engage corresponding alignment features of the fixed connector assembly when the rear housing is moved to the final coupled position.

15. The fiber optic connector system of claim 9, wherein the fiber optic connector assembly includes a front housing and a rear housing, the front housing being coupled to the fixed housing, the fiber optic connectors being held by the rear housing, the front housing having a latch having lips extending therefrom, the latch engaging the fixed housing such that the fixed housing is held between the lips.

16. A fiber optic connector system comprising:
a fixed connector assembly having a plurality of fixed fiber optic connectors extending along connector axes, the fixed connector assembly having a fixed housing having a front end and sides extending from the front end generally parallel to the connector axes; and
a fiber optic connector assembly removably coupled to the fixed connector assembly, the fiber optic connector assembly having a front housing and a rear housing movably coupled to the front housing, the front housing being side-loaded to an initial coupled position in which the front housing is coupled to the fixed housing, the front housing being latched to the front end of the fixed housing of the fixed connector assembly to secure the fiber optic connector assembly with respect to the fixed connector assembly, the fiber optic connector assembly having a drive mechanism coupled between the front housing and the rear housing, the drive mechanism moving the rear housing in an advancing direction from a retracted position to an advanced position, the front housing being side-loaded in a direction generally perpendicular to the advancing direction, the fiber optic connector assembly having a plurality of fiber optic connectors having mating ends being driven with respect to the front housing in a mating direction generally parallel to the connector axes for mating with corresponding fixed fiber optic connectors when the rear housing is moved from the retracted position to the advanced position.

17. The fiber optic connector system of claim 16, wherein the fixed connector assembly includes a panel having a front and a panel opening therethrough, the panel having a rail extending from the front proximate the panel opening, the rail having an open front and an open side, the fiber optic connector assembly having a base with the front housing coupled to the base, the base being loaded into the rail through the open side to position the fiber optic connector assembly with respect to the fixed connector assembly, the base extending forward from the front when the fiber optic connector assembly is coupled to the fixed connector assembly.

18. The fiber optic connector system of claim 16, wherein the fixed housing includes a projection extending forward therefrom, the projection extending between opposite sides and a front edge, the front housing having a latch extending therefrom, the fiber optic connector assembly being side-loaded such that the latch is loaded over, and slides along, one of the sides of the projection, the latch engaging both sides of the projection when the fiber optic connector assembly is coupled to the fixed connector assembly, the fiber optic connector assembly extending forward of the front edge of the projection when the fiber optic connector assembly is coupled to the fixed connector assembly.

19. The fiber optic connector system of claim 16, wherein the front housing has a latch having lips extending therefrom, the latch engaging the fixed housing such that the fixed housing is held between the lips.

* * * * *